United States Patent [19]

Cupedo

[11] 4,167,263
[45] Sep. 11, 1979

[54] BUTTERFLY VALVE

[75] Inventor: Douwe J. Cupedo, Rotterdam, Netherlands

[73] Assignee: Cupedo's Octrooimaatschappij B.V., Rotterdam, Netherlands

[21] Appl. No.: 847,020

[22] Filed: Oct. 31, 1977

[30] Foreign Application Priority Data

Nov. 1, 1976 [NL] Netherlands ..................... 7612097

[51] Int. Cl.² ............................................. F16K 25/00
[52] U.S. Cl. ..................................... 251/161; 251/163
[58] Field of Search ............... 251/161, 162, 163, 164, 251/165, 166

[56] References Cited

U.S. PATENT DOCUMENTS

| 2,076,841 | 4/1937 | Heggem | 251/164 |
| 3,033,513 | 5/1962 | Valliez | 251/163 |
| 3,046,802 | 7/1962 | Cupedo | 251/162 X |
| 3,854,696 | 12/1974 | Keyes | 251/163 |

FOREIGN PATENT DOCUMENTS

555373 3/1957 Belgium ................................. 251/163

Primary Examiner—Harold W. Weakley
Attorney, Agent, or Firm—Browdy and Neimark

[57] ABSTRACT

Butterfly valve comprising a body and a valve seat arranged therein, on which a valve member is supported. The valve member comprises an operating rod and the assembly of valve member and operating rod has a fixed pivot point at the bottom of the body. The operating rod can be moved by means of pins movable in grooves and slots in such a manner that when the valve is opened the valve member first pivots about the pivot point to lift the valve member from the seat and subsequently rotates about the pivot point to fully open the valve.

14 Claims, 12 Drawing Figures

BUTTERFLY VALVE

The present invention relates to a butterfly valve. Butterfly valves are frequently used in pipe systems on ships, oil tankers, in the chemical industry, on drilling platforms, etc. The well-known butterfly valves have a rubber seal which is usually quite satisfactory, but which is hardly resistant to heat and is furthermore affected in handling certain chemical substances. In order to remove these drawbacks it has been proposed in the past to manufacture butterfly valves having a metal-to-metal seal. However, the practical feasibility of this idea met with the problem that such butterfly valves, at higher temperatures, do no longer seal properly due to the expansion of the metal, while such valves are furthermore inclined to jam, particularly if a conical valve seat is used.

The object of the present invention is to remove these drawbacks. To this end, according to the invention, a butterfly valve of the type described above is characterized in that the operating rod has a fixed pivot point in the body and that the control means can pivot the operating rod with the valve member about the fixed pivot point from the closed valve position to lift the valve member, before said valve member is rotated to open the valve.

The invention will now be elucidated in more detail with reference to the enclosed drawings showing an embodiment by way of example.

Figures 1, 4:
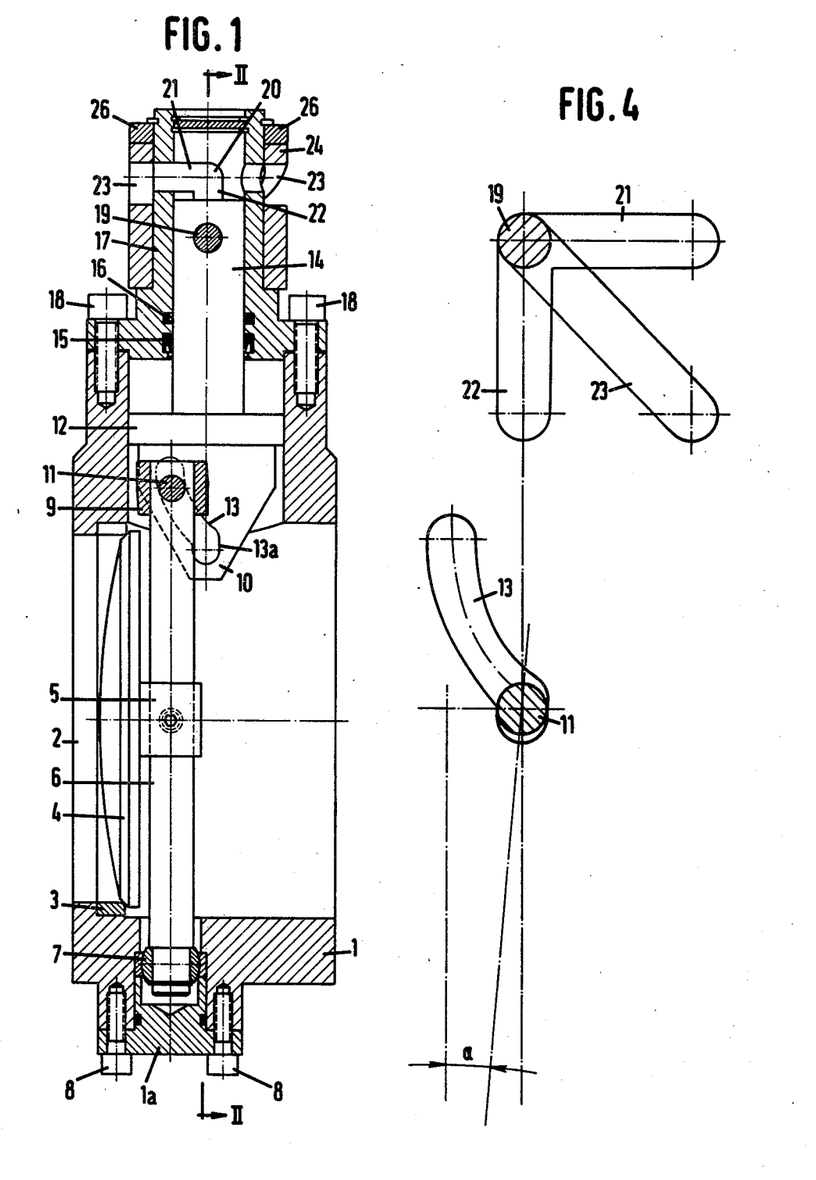
FIG. 1 shows a cross-sectional view of an embodiment of a valve body having a valve member shown in side elevational view.
FIGS. 3, 4 and 5 schematically show the way in which the valve is controlled.
Figure 2:
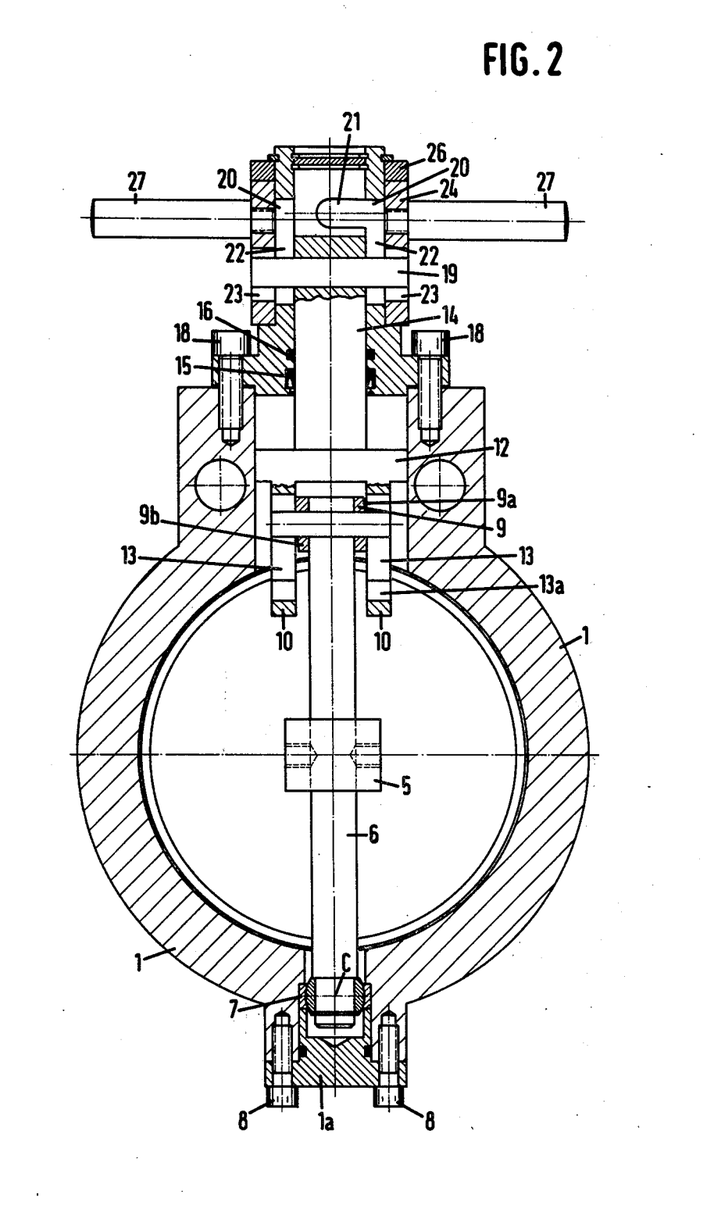
FIG. 2 shows a similar sectional view taken along the line II—II of FIG. 1.

Reference is made to FIGS. 1 and 2. A valve body 1 is provided with a bore 2 in which a valve seat 3 is arranged. The valve seat 3 is a metal valve seat. Resting against the valve seat in the depicted, substantially closed position of the butterfly valve is a valve member 4. The valve seat may also be conical. The valve and valve seat may also have a preferably narrow, flat seal. Besides the valve may be fully or partially ball-shaped and the seat may have a shape adapted thereto. On the side opposite to the seat the valve member 4 is provided with a block 5, in this particular embodiment arranged centrally on the valve member. The block 5 serves to secure an operating rod 6. The operating rod is fixedly mounted in block 5 with appropriate means, for example bolts. Besides, at the lower end in the drawing, the operating rod has a fixed pivot point C in body 1, which point permits both pivotal and rotary movement of the operating rod. To this end a plain bearing 7 is arranged in this particular example. Bearing 7 is fixed in a recess in the body by means of a filler 1a sealingly attached to the body with bolts 8.

At the top the operating rod 6 is provided with a guide block 9 disposed between two substantially parallel flanges 10 pointing in downward direction from a piston 12. Right across the operating rod 6 and guide block 9 is arranged a pin 11 extending into grooves or slots 13 in flanges 10 on either side of the guide block. The ends of the pin can engage the edges of slots 13 directly or via ball bearings on the ends of the pin. Slots 13 may be slanting, but in the embodiment under consideration they have the form of a part of an arc of a circle and extend in such a manner that the tangent at the upper end of the circular arc in the drawing is substantially vertical. The upper end of the slots is closed. From the upper end the slots extend downwardly in a direction receding from the valve seat so that, in the upper position, the pin is some pin thicknesses closer to the valve seat than in the lower position. The lower end of the circular slots terminates in a short vertical slot portion 13a, which provides a rest position for pin 11.

The effect of the configuration described above is as follows. If, in a manner to be described hereinafter, piston 12 is moved upwardly, the slots along pin 11 move upwardly as well, as a result of which the pin is pushed to the right. At the top of the stroke of piston 12 the pin is in the lower vertical slot portions 13a. As the pin has moved to the right, the upper part of operating rod 6 has been moved to the right as well, so that the operating rod has pivoted about the fixed pivot point C, thereby lifting valve member 4 from seat 3. The operating rod can pivot maximally through the angle α shown in the drawing. This angle should be selected so that the valve member can subsequently be pivoted with respect to the valve seat by rotation of the operating rod about its longitudinal axis, without the valve member thereby striking the valve seat. As the slots are rather steep with respect to the longitudinal axis of the operating rod, a great force can be exerted on the valve member via piston 12. This provides on the one hand in the closed position a proper seal, while on the other hand lifting of the valve member to open the valve is possible at all times. This is of great importance in using conical valve seats.

Piston 12 is provided with a piston rod 14 which extends through a bore in a body portion 17 through sealing members 15, 16. Body portion 17 is sealingly mounted on body 1 by means of bolts 18. On the end remote from piston 12 the piston rod 14 is provided with a piston rod pin 19 extending right across the rod, which pin extends on either side of the piston rod through a perpendicular groove 20 in the wall of body portion 17 into slanting slots 23 arranged in a sleeve 24 placed around body portion 17. Sleeve 24 can be rotated about body portion 17 while retaining its vertical position. To this end the sleeve is retained vertically between a shoulder of body portion 17 and a ring 26 mounted on body portion 17. Moreover the sleeve comprises handspikes 27 for operation purposes. Instead of handspikes also other suitable control means, such as a handwheel, or electric, hydraulic or pneumatic control means are applicable. This piston rod pin is adapted to cooperate with the slot walls either directly or through ball bearings.

Figures 3, 5:
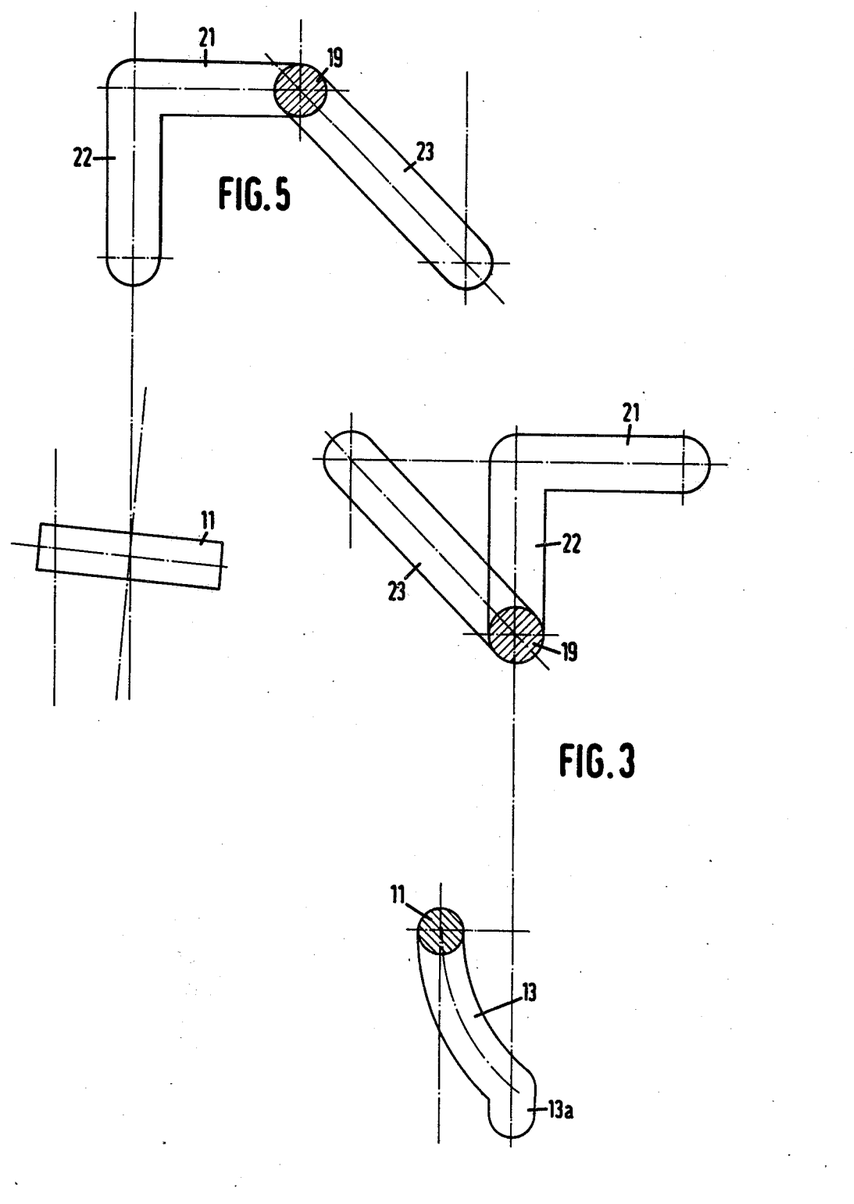

To illustrate the control and the operation of the above assembly of grooves or slots and pins, reference is made to FIGS. 3, 4 and 5. These drawings show respectively the positions of slots 13, 20 and 23 and pins 11 and 19 in the closed, the lifted and the fully opened valve position. Slots 23 and 21 are drawn in a plane; in point of fact these slots are made in cylindrical walls.

FIG. 3 shows the situation with the valve in the closed position. Pin 11 is then at the top of slot 13, so that the valve member is urged against the valve seat. Piston rod pin 19 is at the bottom of the vertical slot portion 22 of the perpendicular slot 20 in body portion 17. Furthermore the piston rod pin is at the bottom of the slanting slot 23 in sleeve 24. It is observed that the drawings only show one slanting slot and one perpendicular slot, each cooperating with one end of the piston rod pin. It will be clear that the other end of the piston rod pin cooperates with corresponding slots.

If, starting from the closed valve position (FIG. 3), sleeve 24 is rotated, slot 23 will move to the right from the position shown in FIG. 3. As a consequence, piston rod pin 9 is moved upwardly in the vertical portion of the perpendicular slot 20. Together with piston rod pin 19, also piston rod 14, piston 12 and flanges 10 move upwardly, so that slot 13 moves upwardly simultaneously with respect to pin 11, during which the operating rod 6 pivots about the fixed pivot point C. The valve member is thereby lifted.

The movement outlined above continues till piston rod pin 19 is at the top of the vertical slot portion 22 and at the same time at the top of the slanting slot 23. Pin 11 is then positioned in the lower, vertical portion 13a of slot 13. The valve is then fully lifted. This situation is shown in FIG. 4.

If sleeve 24 is rotated further in the same direction from the position shown in FIG. 4, slot 23 moves further to the right with respect to the perpendicular slot, so that piston rod pin 19 is taken along by the end of the slanting slot to the end of the horizontal slot portion 21 of the perpendicular slot. During movement of the piston rod pin in the horizontal plane, the piston rod rotates about its longitudinal axis, just as piston 12. Flanges 10 of the piston transmit this rotation to the operating rod and the valve member via slots 13 and pin 11. When the piston rod pin reaches the end of the horizontal slot portion 21, the valve member is rotated 90° with respect to the original position. Said rotation takes place about an axis forming an angle α (the pivot angle of the operating rod) with the plane of the valve seat. Consequently, pin 11 has a slanting position when the valve is open, as is shown in FIG. 5. For this it is necessary that block 9 has bevelled sides, as is shown in FIG. 2 at 9a and 9b. Also, slot portion 13a is to this end slightly deeper than the pin thickness.

Figure 6:
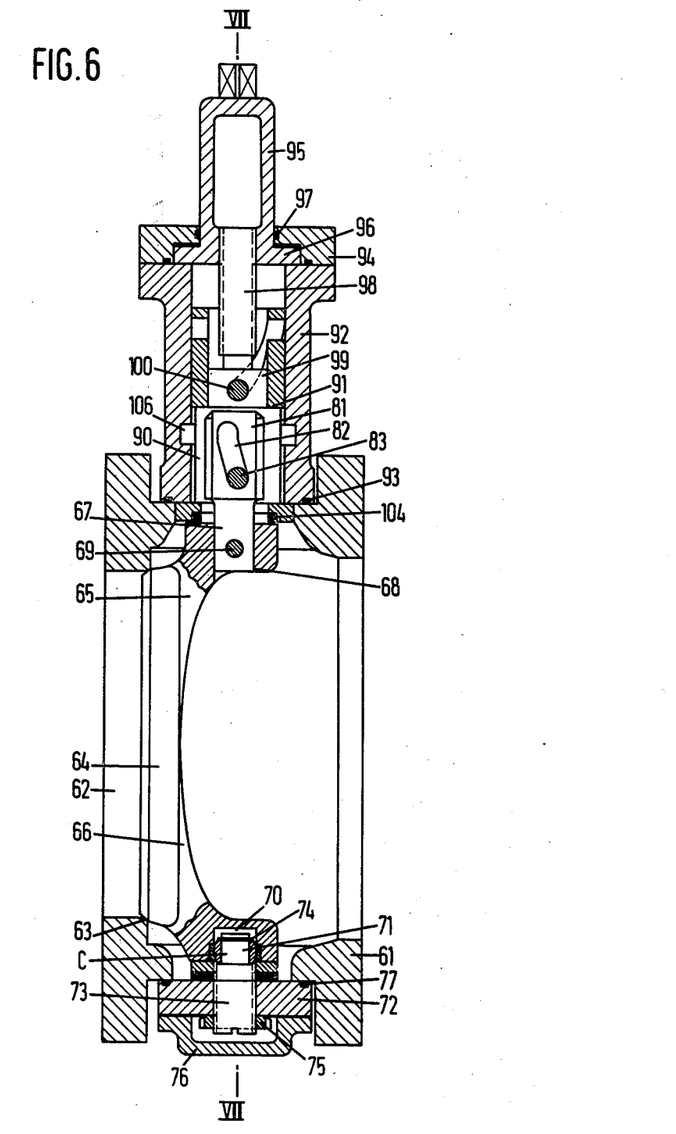
FIG. 6 shows a cross-sectional view of a different embodiment of a butterfly valve according to the invention.
Figure 7:
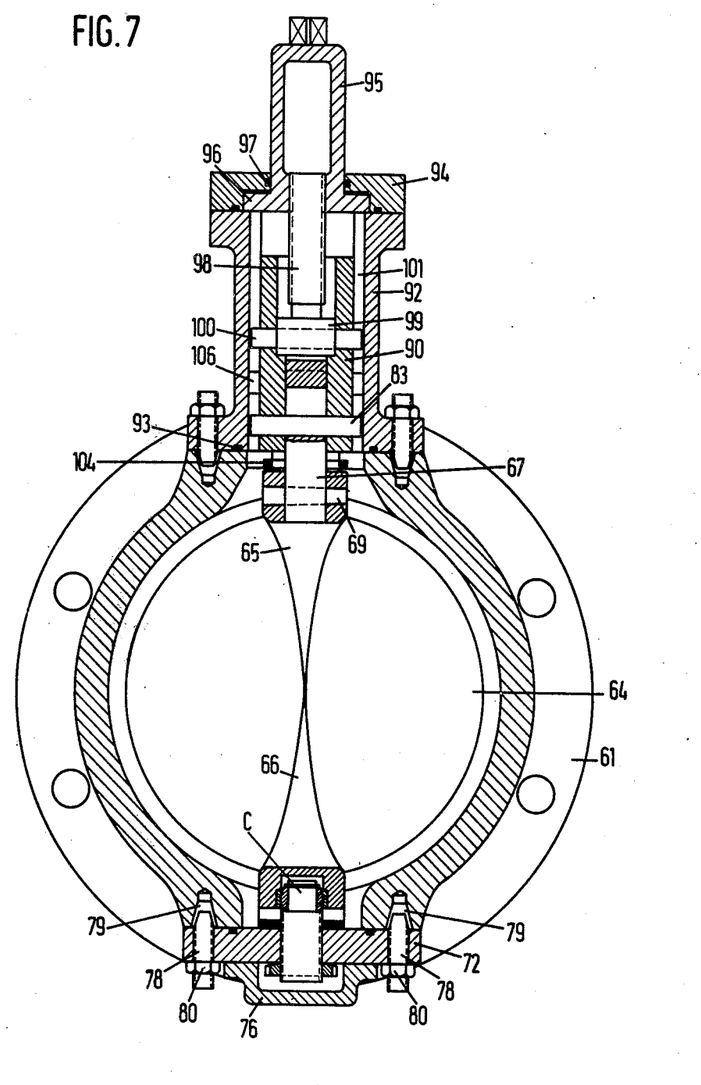
FIG. 7 shows a similar sectional view taken along the line VII—VII of FIG. 6.

FIGS. 6 and 7 show a different embodiment of a butterfly valve according to the invention. A valve body 61 has a bore 62 in which a valve seat 63 is formed. The valve seat can also be formed in a separate annular member which is then arranged in the bore in a well-known manner. In the depicted closed position of the valve a valve member 64 rests against the valve seat. The valve and the valve seat can have various shapes, adapted to one another. Thus, for instance, the valve may be plane, conical or spherical adjacent to the seal.

On the side remote from the seat the valve member is provided with an upper projection 65 and a lower projection 66, as shown in the drawings. The projections widen from the centre of the valve member to the edge of the valve member, as can be seen in the drawings. This shape ensures that in the opened position of the valve, in which the valve member is substantially transverse to the valve seat, the valve member impedes the flow through bore 62 as little as possible.

The upper projection 65 comprises an operating rod 67 which, in the embodiment shown, is received in a vertical bore 68 in said projection and is secured by means of a cross-pin 69.

The lower projection 66 has a pivot point C, permitting both a pivoting and a rotary movement of the valve member. To this end a chamber 70 is formed in the lower projection, in which chamber a plain bearing 71 is positioned in this embodiment. The inner ring of bearing 71 is mounted on a shaft 73 threadedly mounted in a filler 72, and rests on the lower side against a shoulder of the shaft, while the bearing is secured against sliding in upward direction by a locking member 74. The shaft itself can be locked at the bottom of the filler by means of a locking nut 75. This configuration renders it possible to adjust the bearing in vertical direction. Arranged over the locking nut 75 and the lower side of shaft 73 is a cover plate 76 secured against the filler with bolts or with studs and nuts. Disposed between filler 72 and body 1 is a sealing washer 77 to prevent penetration of dirt.

In order to also adjust the bearing in horizontal direction, adjustment bolts 78 are used which extend through the filler into conical bores 79 in body 1. The ends of the adjustment bolts extending into the conical bores are likewisse bevelled, so that the filler with the bearing can be shifted in horizontal direction by turning the adjustment bolts to a greater or lesser extent into the filler. The adjustment bolts include locking nuts 80. After adjustment of the bearing the filler can be secured by means of bolts, not shown, extending through slotted holes in the filler.

Figure 8:
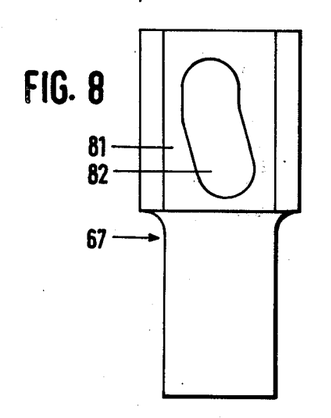
FIGS. 8 and 9 show in side elevational and in bottom view the valve rod of FIGS. 6 and 7.
Figure 9:
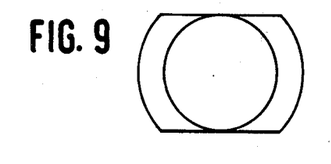

The operating rod 67 is shown in FIGS. 8 and 9. It is apparent from the drawings that the operating rod has a widened and likewise flattened head 81, in which a slot 82 being at a slight angle with respect to the longitudinal axis of the operating rod is arranged. The longuitudinal axis of slot 82 crosses the longitudinal axis of the operating rod in upward direction from the right to the left, while the upper end of the slot, remote from the valve member, is again vertically oriented. Through the slot extends a pin 83, which is vertically reciprocating in a manner to be described hereinafter. In FIG. 6 the pin 83 is drawn in the lowest position, if the pin is moved upwardly it is pushed against the sidewall of the slot, so that the operating rod is forced sidewards (in FIG. 6 to the right). As a result, the assembly of valve member and operating rod pivots about pivot point C (in FIG. 6 to the right), so that the valve member is lifted from the seat.

Figure 10:
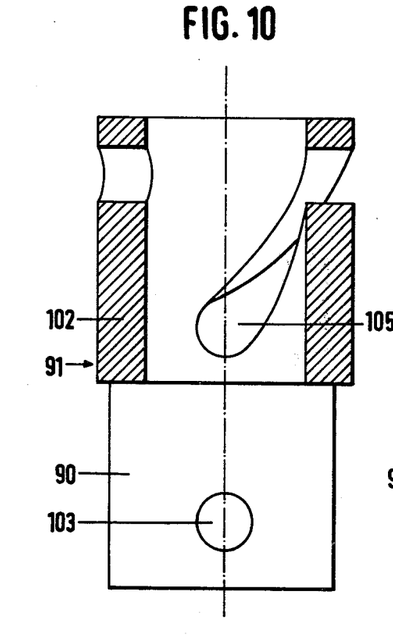
FIGS. 10, 11 and 12 show in single views a detail of the construction shown in FIGS. 6 and 7.
Figure 11:
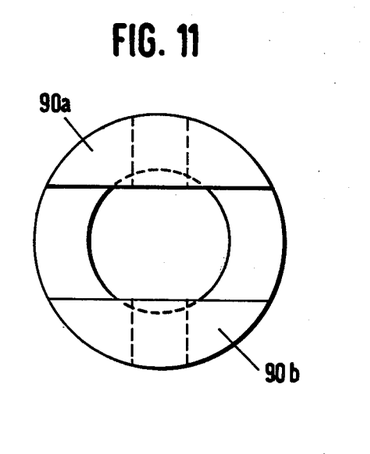
Figure 12:
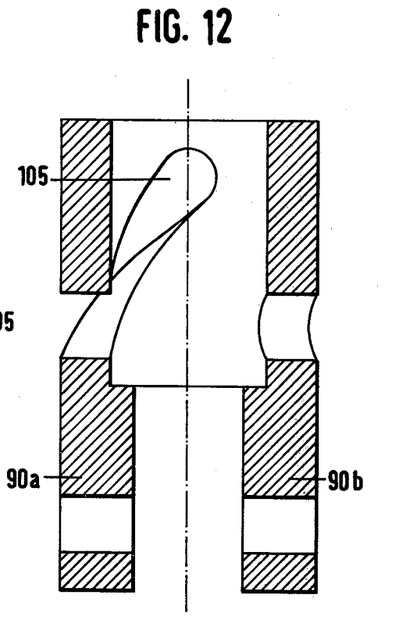

The head 81 of the operating rod extends into the lower portion 90 of a specially formed sleeve 91, shown in FIGS. 10, 11 and 12 in cross-sectional view and in bottom view, said sleeve being disposed in a body portion 92. Body portion 92 is hollow, the inner wall being substantially circle-cylindrical. In substantially the same manner as filler 72, body portion 92 is adjustably mounted on valve body 61. Arranged between valve body 61 and body portion 92 is a sealing washer 93 to prevent penetration of dirt. A cover 94 having a central opening is sealingly mounted on the top of the body portion. The central opening of the cover is widened on the side facing body portion 92, so that between the cover and the upper edge of the body portion a cylindrical chamber is present, which is adapted to receive a collar 96 formed on a screw head 95. Screw head 95 can rotate in the central opening of the cover and in the cylindrical chamber, and is to this end provided with handspikes or a handwheel, not shown. Arranged again between the wall of the central bore and the screw head is a sealing washer 97.

The screw head further comprises a threaded central bore in which a screwed spindle 98 extends. By turning the screw head, therefore, the screwed spindle can be vertically reciprocated if rotation of the screwed spindle is impeded.

The screwed spindle 98 extends into sleeve 91 and terminates in a block 99, through which a cross-pin 100 is arranged. The ends of the cross-pin 100 extend, through sleeve openings to be described hereinafter, into grooves 101 in the inner wall of body portion 92, said grooves being arranged opposite one another and extending vertically throughout the length of said body portion. Owing to cooperation of pin 100 and grooves 101, rotation of the screwed spindle 98 is consequently prevented. The ends of pin 83 arranged through the head of operating rod 67 likewise extend into grooves 101 through openings in the lower part 90 of sleeve 91.

Sleeve 91 includes a lower portion 90 and an upper portion 102. The lower portion has a transverse bore 103 for pin 83. Furthermore the lower portion is vertically cut to receive the flattened head 81 of operating rod 67, so that the lower portion comprises in fact two legs 90a and 90b having a cross-section in the form of a segment of a circle. Upon rotation of the valve member about point C the head of the operating rod can also slide to and fro between legs 90a and 90b to lift or close the valve. It is noted that during this sliding movement of the head of the operating rod the seal between bore 62 and the interior of body portion 92 is maintained as a result of a sealing washer 104 disposed in the valve member around the passage opening for the operating rod 67, said washer having a flexible, projecting edge which during operation remains continuously in sealing contact with the upper projection 65 of the valve member.

The upper portion 102 of sleeve 91 is hollow-cylindrical and the cylindrical wall comprises two opposed helical slots 105, each covering a sector of 90°. In the manner described above the cross-pin 100 extends through these slots into vertical grooves 101 of body portion 92.

Before the operation of the control system described will be explained it should be noted that a circular horizontal groove 106 is provided in the inner wall of body portion 92, adjacent to the upper end of the slanting slot 82 in the head of the operating rod.

The operation of the construction is as follows. Starting from the depicted closed position of the valve the screw head is turned to the right or to the left, depending on the type of thread of screwed spindle 98, to open the valve. The screwed spindle moves upwardly, but cannot rotate because pins 83 and 100 engage grooves 101. Sleeve 91 can neither rotate due to the presence of pin 83. As a result, the sleeve is also moved upwardly, thereby taking along pin 83. During this upward movement pin 83 pushes the head of the operating rod aside in the manner described above, so that the assembly of operating rod and valve member rotates about point C and the valve is lifted. This movement continues till pin 83 reaches the upper, vertically oriented end of slot 82. Sleeve 91 lies then at least substantially against flange 96 of screw head 95. Moreover the ends of pin 83 are then adjacent to the circular groove 106.

When screw head 95 continues to rotate, sleeve 91 cannot move upwardly any further, but the sleeve can rotate about its longitudinal axis, because this is no longer prevented by pin 83, which can now move with the ends in the circular horizontal groove 106. Rotation of the screwed spindle is still prevented, however, by pin 100 extending into the vertical grooves 101, so that upon further control of the screw head the screwed spindle and pin 100 continue their vertical movement. Pin 100 extending through the helical slots of the sleeve strikes the upper edges of said slots, causing the sleeve to rotate till pin 100 has reached the upper ends of the helical slots. The sleeve is then rotated through 90°, thereby taking along the head of the operating rod and the valve member via pin 83, so that the valve is in the fully opened position at that moment. To close the valve, the screw head should be turned in opposite direction, the steps described above taking place in the reverse order.

If desired, pins 83 and 100 may have friction-reducing means such as ball bearings, roller bearings or plain bearings in the places of contact with the various groove and slot edges.

With the construction described above it is achieved that the butterfly valve can be opened or closed with a direct transmission, while yet sufficient force can be exerted to keep the valve closed or to open it. Furthermore the open position of the valve is unambiguously fixed, so that the valve cannot be opened "too far".

Though the construction described above is particularly suitable for butterfly valves having a metal seat, this construction can also be applied very well in fully or partially rubber or synthetic material seats. Besides, the embodiments described above should only be considered by way of example and that constructions modified in a manner which is obvious to the expert should be considered to fall within the framework of the invention. For example, the invention likewise applies to valves having seats fully embracing the valve member. Besides the pins may be suitably formed projections.

Finally, the constructions described above can be used with a small modification of the slots for a ball tap.

I claim:

1. In a butterfly valve comprising a body, a valve seat in the body, a valve member, an operating rod for the valve member and control means to control movements of the operating rod, the improvement wherein the assembly of valve member and operating rod has a pivot point in the body; wherein the control means are adapted to pivot this assembly about the pivot point from the closed valve position to lift the valve member before it is rotated to open the valve; wherein on the operating rod is formed a head having a slanting slot with respect to the plane of the valve member; and wherein through said slot a first cross-pin extends, the ends of which extend into vertical grooves in the inner wall of an upper, hollow-cylindrical body portion, said cross-pin being at the bottom of the slot when the valve is closed and being disposed to be moved upwardly through the vertical grooves and the slot, the assembly of the operating rod and the valve member pivoting about the pivot point to lift the valve member as a result of the inclined position of the slot.

2. A butterfly valve according to claim 1, wherein the control means comprise a sleeve located in the upper body portion, said sleeve having at the bottom two legs engaging the head of the operating rod and having a transverse bore to receive the first cross-pin.

3. A butterfly valve according to claim 2, wherein the sleeve has an upper part including two opposed helical slots each covering a sector of 90° and through which a second cross-pin extends into vertical grooves in the inner wall of the upper body portion.

4. A butterfly valve according to claim 3, wherein the second cross-pin is also arranged in a transverse bore of a screwed spindle extending into the sleeve, which spindle can cooperate with a threaded central opening in a screw head mounted for rotation on the upper body portion, by means of which head the screwed spindle can be vertically reciprocated.

5. A butterfly valve according to claim 4, including a circular horizontal groove adjacent the upper end of the slot in the head of the operating rod in the inner wall of the upper body portion, which groove is adapted to receive the ends of the first cross-pin after the valve member has been lifted, to enable rotation of the valve member.

6. A butterfly valve according to claim 1 wherein the valve member comprises an upper projection in which the operating rod is mounted and a lower projection in which the pivot point is located, the upper and the lower projection leaving the surface of the valve member substantially free.

7. A butterfly valve according to claim 1 wherein the pivot point is formed by a spherical bearing.

8. A butterfly valve according to claim 7, wherein the outer member of the spherical bearing is secured to the lower projection of the valve member and that the inner member is secured to a bolt extending through a retaining plate.

9. A butterfly valve according to claim 8, wherein the bolt is vertically adjustable.

10. A butterfly valve according to claim 8, wherein the retaining plate is secured to the valve body with screwed connection members extending through slotted holes, wherein adjustment bolts having bevelled ends extend through the retaining plate into conical bores in the valve body to enable adjustment of the retaining plate in horizontal direction.

11. A butterfly valve according to claim 1, wherein an upper body portion is mounted on the valve body for horizontal adjustment by means of screwed connection members and slotted holes, and ajustment bolts having bevelled ends extending through a flange of the upper body portion, said ends extending into conical bores in the valve body.

12. A butterfly valve according to claim 6, including, between the upper projection and the valve body, a sealing member is provided which separates the interior of the upper body portion from the bore in the valve body.

13. A butterfly valve according to claim 1, wherein the cross-pins include friction-reducing means in one or more of the places of contact having corresponding groove walls or slot walls.

14. A butterfly valve according to claim 1 including an upper body portion and a cover of the upper body portion, said upper body portion and said cover forming a circular chamber to accommodate a circular collar of the screw head, so that the screw head can be turned with respect to the upper body portion but cannot be shifted.

* * * * *